United States Patent [19]

van der Pot et al.

[11] 4,358,225
[45] Nov. 9, 1982

[54] DEEP OCEAN CONDUIT

[75] Inventors: Barend J. G. van der Pot, Delft; Wilfred Griekspoor, Wassenaar, both of Netherlands

[73] Assignee: Hollandsche Beton Groep N.V., Rijswijk, Netherlands

[21] Appl. No.: 171,073

[22] Filed: Jul. 22, 1980

Related U.S. Application Data

[63] Continuation of Ser. No. 902,143, May 2, 1978, abandoned.

[51] Int. Cl.³ .......................... F02D 21/00; E02B 9/00
[52] U.S. Cl. .................................... 405/303; 405/195
[58] Field of Search ............... 138/120, 106, 155, 109, 138/114, 118; 9/8 P; 285/163, 114; 405/52, 195, 303; 98/DIG. 7; 114/264

[56] References Cited

U.S. PATENT DOCUMENTS

| 129,405 | 7/1872 | Hale | 285/163 |
|---|---|---|---|
| 2,452,941 | 11/1948 | Little | 98/DIG. 7 |
| 3,162,214 | 12/1964 | Bazinet | 285/163 |
| 3,206,229 | 9/1965 | Kramer | 285/114 |
| 3,323,552 | 6/1967 | Whitehead | 138/120 |
| 3,501,173 | 3/1970 | Petersen et al. | 285/114 |
| 3,819,210 | 6/1974 | Daniel et al. | 285/114 |
| 3,929,164 | 12/1975 | Richter | 138/120 |
| 4,065,822 | 1/1978 | Wilbourn | 9/8 P |
| 4,116,009 | 9/1978 | Daubin | 138/114 X |
| 4,298,295 | 11/1981 | Bozzo et al. | 138/118 X |

FOREIGN PATENT DOCUMENTS 758350 10/1956 United Kingdom ........... 98/DIG. 7

Primary Examiner—James E. Bryant, III
Attorney, Agent, or Firm—Sughrue, Mion, Zinn, Macpeak & Seas

[57] ABSTRACT

A flexible conduit for carrying cold ocean water at great depths to the surface comprises a plurality of spaced, heavy annular rings 1 of concrete or the like between which are mounted tubes 2 of flexible material which form the walls of the conduit. The tubes may bear the tension load of the rings directly, or they may be suspended from loosely mounted rods 6 or cables 11.

8 Claims, 6 Drawing Figures

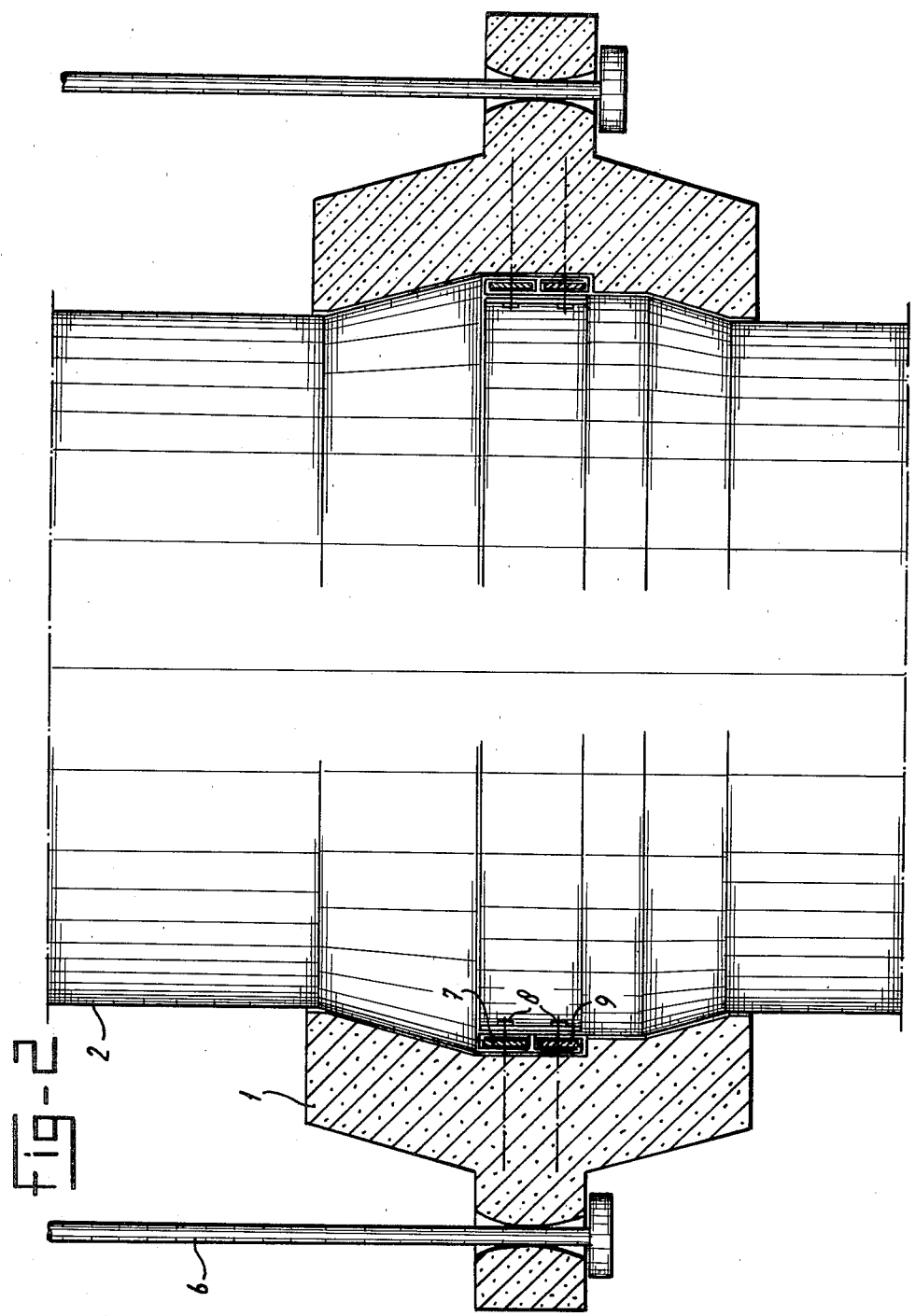

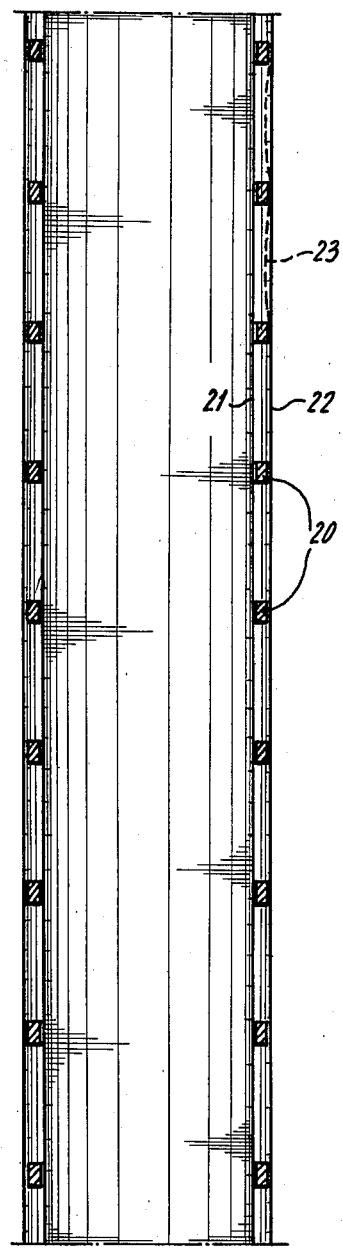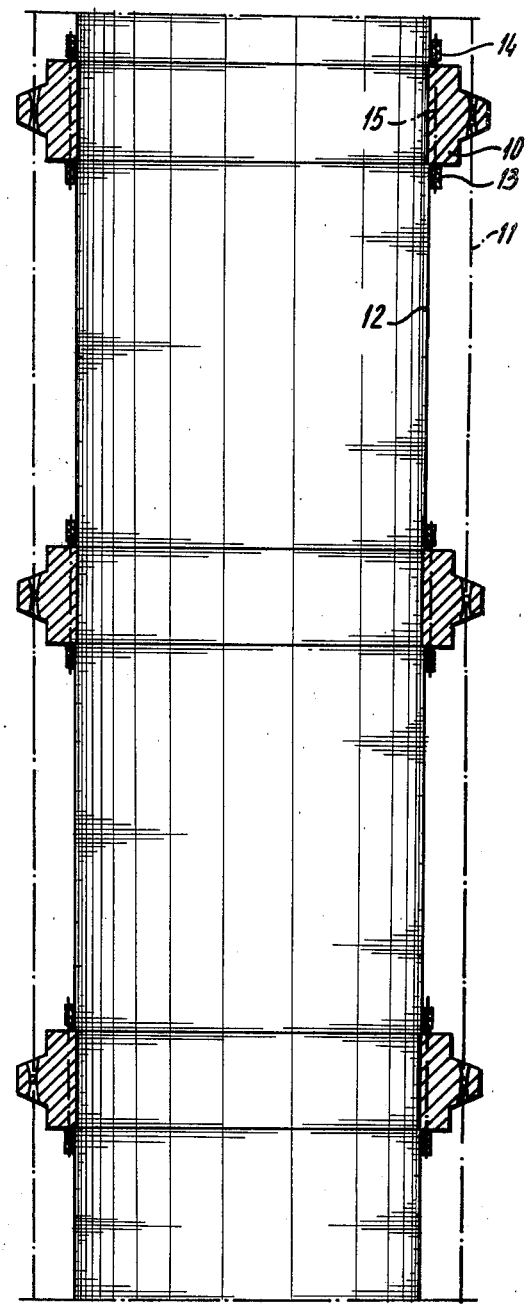

DEEP OCEAN CONDUIT

This is a continuation of application Ser. No. 902,143, filed May 2, 1978, now abandoned.

BACKGROUND OF THE INVENTION

The invention relates to a deepocean conduit for the transporation of sea water from a location at great depth towards a location adjacent to the water surface, said conduit comprising support members as well as a wall from flexible material kept in shape by the support members. Such a conduit is known from the TRW report, issued in June 1975 in the U.S.A.

Such a conduit can be applied for the upward transportation of sea water of low temperatures present at great depths, the difference in temperature with the surface water then being used for the generation of energy.

Such a conduit also can be used for the transportation upwardly of minerals such as ore-containing sands and the like.

Conduits of this type have great lengths, for instance lengths of several hundreds or several thousands of meters.

If such a conduit is manufactured from steel one obtains a heavy construction which is subjected to corrosion and bio-fouling. The conduit has to be able to stand up against bending under the influence of transverse flows. The diameter of such a conduit may be 20 meters.

The above mentioned known conduit comprises a cylindrical cage structure made from tubes extending vertically and horizontally. Around said cage a fibre-reinforced synthetic material has been applied, for instance reinforced neoprene. Such a conduit has a relatively low weight, however, in view of its large dimensions, is difficult to handle and it is difficult to make it sufficiently resistant against bending forces.

SUMMARY OF THE INVENTION

Object of the invention is to provide another construction which is more simple to handle, does not offer problems with respect to bending, can be adapted to any length and if necessary is easy to repair.

According to the invention this object in the first place is achieved in that the support members are formed by pressure resistant heavy rings arranged at distances from each other, above each other and interconnected by a connection which only can take up tension and is supple with respect to bending. Instead of a light structure use is made of heavy rings interconnected by tension resistant members, which against bending forces have low or no resistance so that the conduit may give way without much difficulty under the influence of transverse flows. The rings keep the connecting members under tension and in this way limit the freedom of movement of the material of the walls upon which an outer pressure operates which is higher than the inner pressure. Said connection can be formed by the material of the wall itself. However, it also is possible to apply flexible tension members such as cables.

Conceivable also is a combination of flexible tension members with the wall material in the form of annular membranes and it also is possible to apply two annular membranes, the outer one of which serving as connecting element and the inner one arranged concentrically with the outer one at the wall.

The edges of said annular membranes can be fastened by folding them around ring segments which are mounted against the inner or outer side of the support rings.

Instead of cables it is also possible to apply rods which, with clearance and freedom to move, extend through openings of the rings, have a length which is larger than the distance between two adjacent rings and which at their outer ends are provided with abutments, which are larger than the openings through which the rods extend.

Such a conduit not only is flexible over its entire length but is simple to arrange because one starts with lowering the lowermost ring or rings, attaching the tension members and/or wall membranes and in this way gradually construct the conduit so that said conduit gradually moves downwardly from the construction site.

According to the invention it is possible as well to dimension the connection between the rings such that successive rings are at an angle with respect to each other. In this way the conduit by purpose can obtain a curved shape or it is possible in this way to compensate bending resulting from flow. This, in particular, is of importance where the connection is formed by the wall material itself since this material on one hand is under the tension resulting from the weight of the rings and on the other hand under the pressure-difference between the outer pressure and the inner pressure of the conduit and operating upon the outer side of the wall material.

BRIEF DESCRIPTION OF THE DRAWINGS

The invention now will be further elucidated with reference to the drawings.

FIG. 2 shows a cross-section through a ring at larger scale to show the possibility of fastening.

FIG. 3 shows another embodiment.

FIG. 4 shows again another embodiment.

DETAILED DESCRIPTION OF THE PREFERRED EMBODIMENTS

Figure 1:
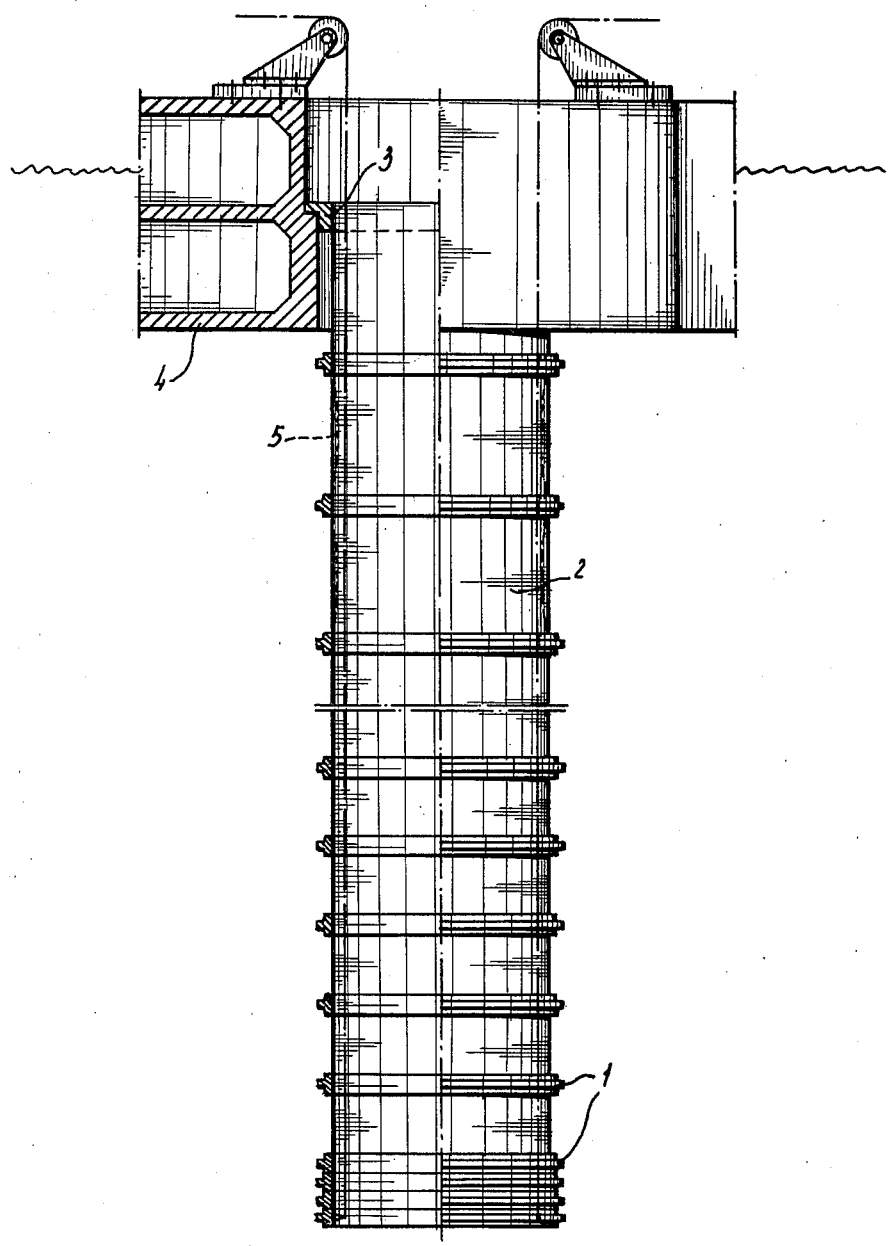
FIG. 1 shows a conduit according to the invention partly in cross-section, partly in side-view.

The conduit shown in FIG. 1 comprises a plurality of concrete rings 1. At the lower end four rings 1 are stacked upon each other to give this end sufficient load.

Between the rings flexible material, such as fibre-reinforced naprene, forming membranes 2 has been provided, which membranes are connected to the rings 1. The upper end has been connected to a support ring 3 mounted in an opening of a supporting structure 4, details of which are not shown, which structure can be on board a vessel or the like.

Reference numeral 5 indicates how the flexible wall could inwardly deform under the influence of the pressure-difference.

FIG. 2 shows a cross-section through a ring 1 and shows how said rings can be interconnected by means of cables or rods 6.

The flexible material 2, which is self supporting if there are no rods or cables 6, has been secured within the rings 1 in that the material with its upper edge is folded around segments 7, which together can form a ring and which by means of bolts 8 or the like are attached to the rings 1.

The lower edge of such a membrane is folded around an equal number of segments 9, which are secured by bolts 8 as well.

It of course is also possible to attach the upper membranes to the upper segments and the lower to the lower segments.

FIG. 3 shows an embodiment in which the rings 20 at the inner side carry flexible wall material 21 defining the flow profile of the conduit and in which the connections are formed by flexible material 22 which has to take up the tensions and the pressure-difference. This material connected to the outer side, may, under the influence of the pressure-difference, take a form as indicated with the interrupted line 23.

FIG. 4 shows an embodiment in which the rings 10 are interconnected by cables 11 and by membranes from flexible material indicated at 12 which membranes are folded about rings 13 and 14 respectively which are connected to the supporting rings by means of connecting anchors 15 which extend parallel to the axis of the conduit.

Figure 5:
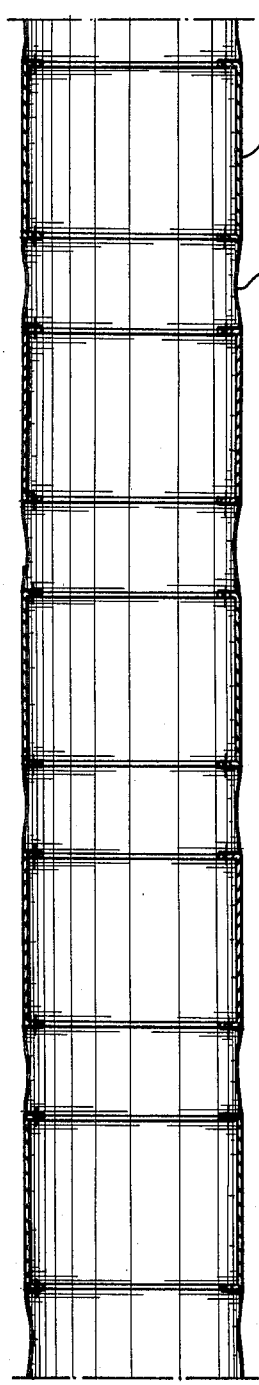
FIG. 5 still shows another possibility.

FIG. 5 shows schematically a possibility of a conduit in which the rings 16 have a greater height than the membranes 17.

Figure 6:
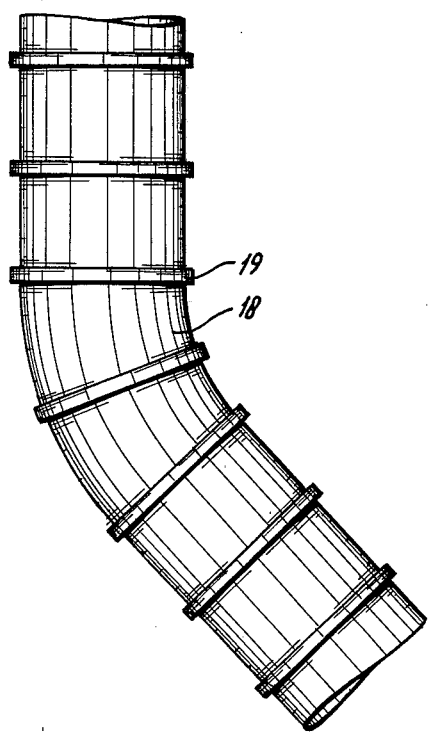
FIG. 6 a sketch of the possibility of a curved conduit.

FIG. 6 shows an embodiment in which the connecting members 18 formed by cables or flexible material are dimensioned such between the rings 19 that a curved conduit is obtained.

We claim:

1. In a deep ocean conduit operative for the transportation of sea water from a location at great depth towards a structure on the water surface, said conduit having its upper end anchored to said structure and its lower end free and unanchored to the sea bed in the operative position, the improvement comprising a tubular wall made from flexible material, and a plurality of heavy annular members spaced apart in planes perpendicular to the axis of the conduit with the flexible wall material connected to said annular members; said flexible tubular wall material, from annular member to annular member, being maintained in its tubular shape at the location of the annular members by its connection to said members and, inbetween the annular members, by the weight of said annular members, said conduit having a diameter of 20 meters or more and a length of more than 100 meters.

2. A conduit according to claim 1, wherein said flexible wall material forms the only connection from annular member to annular member and takes up the weight of the conduit below each flexible respective wall portion formed between adjacent annular members.

3. A conduit according to claim 2, characterized in that the edges of each flexible wall portion extending from one annular member to the next annular member are folded about ring segments attached to said respective annular members.

4. A conduit according to claim 2, wherein said flexible wall portions extending from one annular member to the next annular member are dimensioned such that successive annular members are at an angle with respect to each other.

5. A conduit as claimed in claim 1, further comprising tension resistant means extending from annular member to annular member and forming flexible connections between said annular members.

6. A conduit according to claim 5, wherein said tension resistant means comprises flexible cables.

7. A conduit according to claim 5, wherein said tension resistant means comprises rods which are freely movable and with clearance extend through openings in said annular members, and which have a length which is larger than the distance between two adjacent annular members, the rods at their outer ends being provided with abutments which are larger than the openings through which the rods extend.

8. A conduit according to claim 5, wherein said resistant means comprises flexible sheet-like material spaced outwardly from said tubular wall and disposed concentrically around said wall.

* * * * *